United States Patent
Hannah et al.

(10) Patent No.: US 7,146,506 B1
(45) Date of Patent: Dec. 5, 2006

(54) DIGITAL VIDEO DISPLAY SYSTEM

(75) Inventors: Eric C. Hannah, Pebble Beach, CA (US); David S. Vannier, Saratoga, CA (US); Carol A. Jacobson, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/318,684

(22) Filed: May 25, 1999

(51) Int. Cl.
*G06F 11/30* (2006.01)
*H04N 7/167* (2006.01)

(52) U.S. Cl. .................. 713/189; 713/192; 380/212; 380/216

(58) Field of Classification Search ............ 380/201, 380/205; 713/189
See application file for complete search history.

(56) References Cited

U.S. PATENT DOCUMENTS

| | | | | |
|---|---|---|---|---|
| 4,734,921 A | * | 3/1988 | Giangano et al. ............. | 377/72 |
| 4,916,736 A | * | 4/1990 | Ryan ........................... | 380/218 |
| 5,195,136 A | | 3/1993 | Hardy et al. .................. | 380/43 |
| 5,650,831 A | * | 7/1997 | Farwell ....................... | 348/734 |
| 5,699,426 A | * | 12/1997 | Tsukamoto et al. ......... | 380/240 |
| 5,784,427 A | * | 7/1998 | Bennett et al. ............... | 377/72 |
| 5,963,909 A | * | 10/1999 | Warren et al. ................ | 705/1 |
| 6,005,940 A | * | 12/1999 | Kulinets ...................... | 705/51 |
| 6,137,539 A | * | 10/2000 | Lownes et al. ............. | 348/569 |
| 6,236,727 B1 | * | 5/2001 | Ciacelli et al. ............. | 380/212 |
| 6,847,335 B1 | * | 1/2005 | Chang et al. ................ | 345/3.1 |

OTHER PUBLICATIONS

"Device Bay Interface Specification," Compaq, Intel, Microsoft, Revision 0.85, Feb. 6, 1998, pp. 14-16, 19-20, 25 and 112.
Bill Pearson, "USB and 1394 Living Together in Harmony," Intel Corporation, 1998.
"Digital Visual Interface DVI," Digital Display Working Group Promoters, Revision 1.0, Apr. 2, 1999, pp. 1-62.

* cited by examiner

*Primary Examiner*—Kambiz Zand
(74) *Attorney, Agent, or Firm*—Trop, Pruner & Hu, P.C.

(57) ABSTRACT

A system for receiving and processing digital video information such as a digital television broadcast, includes a modular platform which receives a plurality of hot pluggable cards. The platform is coupled by a high data rate graphics bus to a digital television display. The bus may provide encrypted information to prevent piracy of the video. Because the platform is modular in design, upgrades to the digital video system may be easily implemented using hot pluggable technology without changing the display. Thus, advances in electronics may be incorporated into the platform without necessitating that the owner replace the display.

17 Claims, 5 Drawing Sheets

DIGITAL VIDEO DISPLAY SYSTEM

BACKGROUND

This invention relates generally to video display systems and in particular embodiments to systems adapted to display video television programs.

The convergence of the television receiver and the personal computer has accelerated recently with the advent of the set top computer systems. These systems, sometimes called set top boxes, use a conventional analog television receiver as a display for a computer system. In some cases, the set top box sits on top of the television receiver. By combining the capabilities of a computer system and the television, the system may provide advanced television programming features such as electronic programming guides without requiring the user to incur any unnecessary costs for an additional monitor.

Digital format television broadcasts will be available soon. Currently, high definition television (HDTV) systems receive both digital and analog television broadcasts. The digital broadcasts may include one of the various formats of high definition television (HDTV).

However, at this time, monitors conventionally used with personal computer systems are generally adapted to analog formats. For example, with the Video Electronic Standard Association (VESA) standard an analog television broadcast signal is converted into a digital format in a computer system, and then back into an analog format which is then conveyed across a cable to a television receiver. (See Computer Display Timing Specification v. 1, Rev. 0.8 available at www.vesa.org/standard.html.) Unfortunately, this results in unnecessary conversion of data between analog and digital formats. These unnecessary conversions ultimately limit the bandwidth available for increasing the definition or resolution of the display. However, the widespread prevalence of the VESA connection standard has resulted in the continuing prevalence of analog formats.

As a result, many of the advantages of digital information have not yet been widely available in television receivers and especially those linked to processor-based systems. Thus, there is a continuing need for techniques for facilitating the display of digital format video information and particularly to the display of digital format television broadcast data.

SUMMARY

In accordance with one aspect, a digital television system includes a first and second housing. The first housing includes a receiver adapted to receive a digital television signal. The second housing includes a digital television display. A digital graphics bus couples the receiver in the first housing and the display in the second housing.

DETAILED DESCRIPTION

Figure 1:
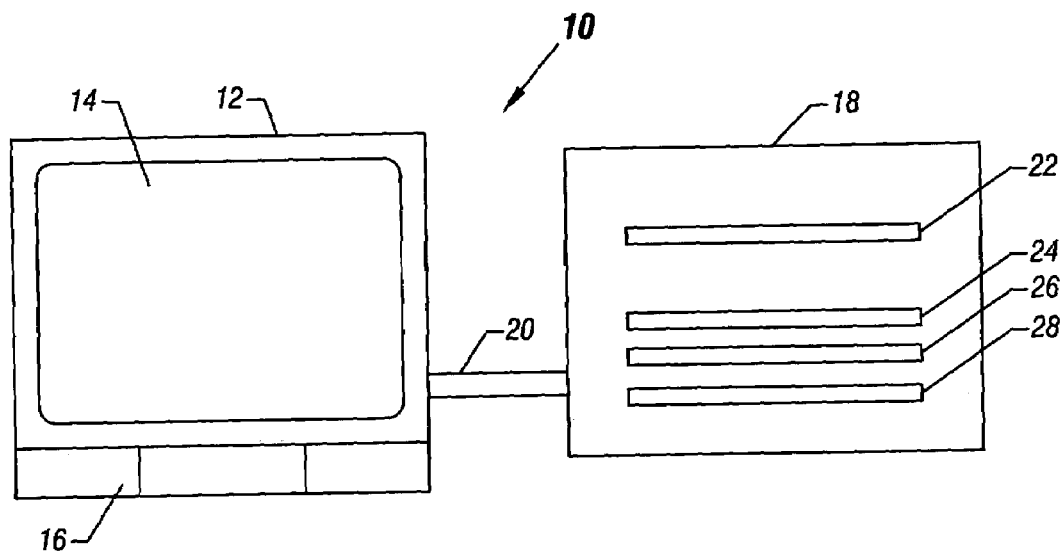
FIG. 1 is a schematic depiction of a digital video display system in accordance with one embodiment of the present invention.

A video display system 10, shown in FIG. 1, may include a video display housing 12 coupled to a modular, upgradable housing or platform 18 by a graphics bus 20. In one embodiment of the present invention, the display hardware is largely contained in the upgradable platform 18. Thus, the display may be used for an extended time with advances in hardware incorporated by replacing various cards which may be inserted into the slots 22, 24, 26 and 28 in the platform 18. Processed video, in a digital format, is transmitted across the graphics bus 20 to the display housing 12 where it may be shown on the screen 14 and audio may be heard through the speakers 16.

Since the hardware in the display housing 12 may be kept to a minimum in some embodiments, technical advances may be readily incorporated into the video display system without undue cost to the owner and user. For example, the platform 18 may receive a plurality of hot pluggable cards including a motherboard card received in the slot 22 and a plurality of device function cards received in the slots 24 through 28. The cards pluggable into the slots 24, 26 and 28 may provide three-dimensional graphics, a graphics processor, a digital video disk player, a video cassette recorder, a digital video storage, an audio processor, or a remote control providing a wireless link interface such as a radio frequency or infrared link, as examples.

Incoming video may be received by the platform 18 from any of a variety of transports. These transports may include without limitation, conventional television broadcasts, satellite transmissions, Internet video distribution, and cable television systems. Incoming video may be processed by the platform 18 and transmitted over an encrypted graphics bus 20 to the display housing 12 where the information may be decrypted and displayed. In accordance with one embodiment of the present invention, the encryption algorithm may encrypt a large portion of the information using a basic system with periodic key changes and periodic use of higher level encryption so that high data transmission rates may be achieved while preventing pirating of the overall video program.

While the design of the high data rate graphics bus includes a number of potential design variations, it may advantageously comply with the Digital Visual Interface (DVI) Specification, Revision 1.0, Apr. 2, 1999 prepared by the Digital Display Working Group (DDWG). The interface uses transition minimized differential signaling (TMDS) for the base electrical interconnections to send graphics data to the display. The transition minimization may be implemented using an algorithm that converts eight bits of data into ten bit transition minimized, DC balanced characters.

Figure 2:
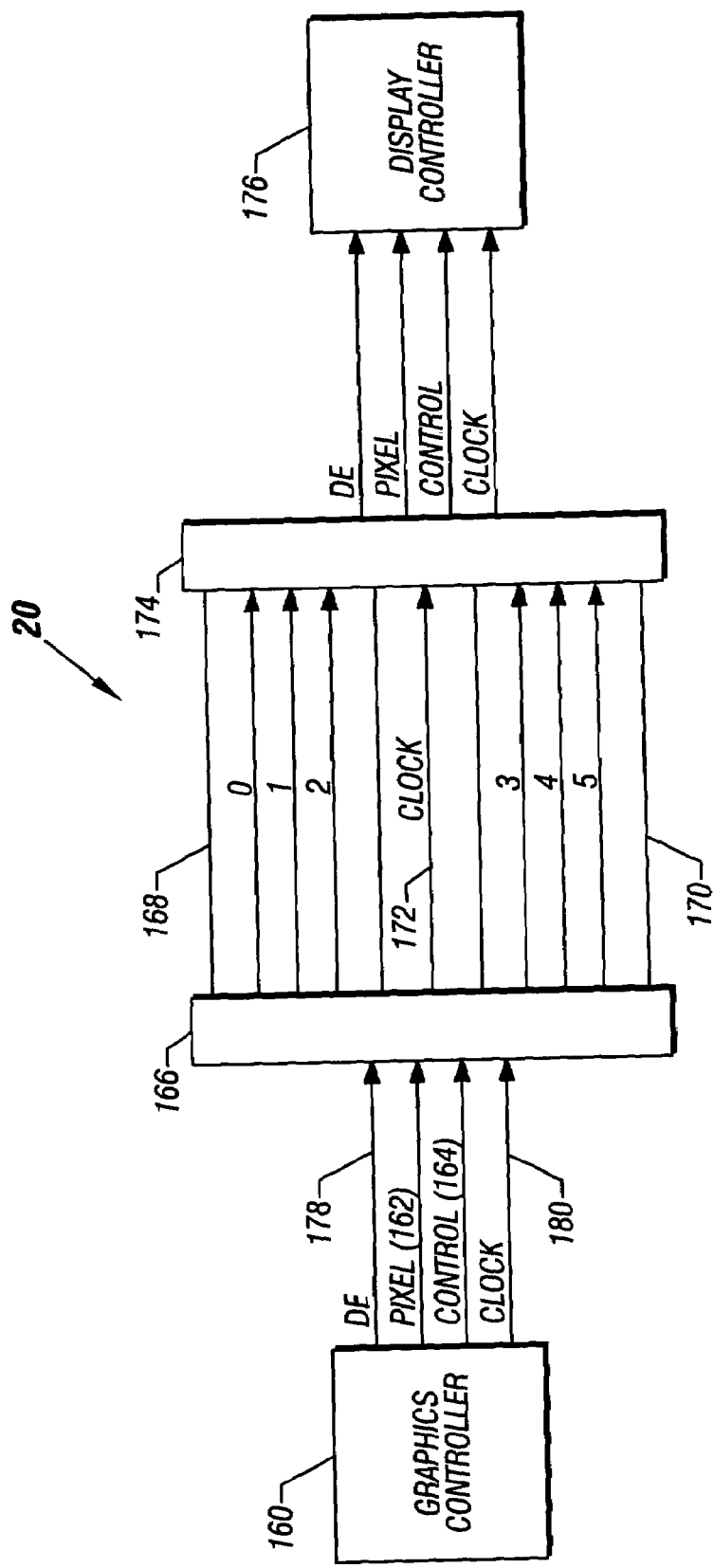
FIG. 2 is a schematic depiction of a graphics bus between the monitor and the platform shown in FIG. 1.

In some embodiments, two TMDS links may be used to enable large pixel format digital display devices and in other cases only one of the links may be utilized, for example, in lower resolution or analog transmissions. The two links may share the same clock allowing the bandwidth to be evenly divided between the two links. Thus, referring to FIG. 2, a graphics controller 160 in the platform 18 may send pixel data 162 and control information 164 to a TMDS transmitter 166 in the platform 18. The transmitter sends three data channels per link 168, 170 together with a clock 172, over the bus 20 to a TMDS receiver 174. The receiver then sends pixel data and control information to a display controller 176 for eventual display. The data transmission may be over copper cables or in some embodiments over fiber optic cables.

In high definition television pixel formats, a reduced blanking interval may be utilized with a single link. The dual link system may provide support for higher bandwidth displays that do not support reduced blanking.

Thus, the digital cathode ray tube (CRT) display housing 12 receives graphical data for display in the digital format with final analog conversion occurring in the display rather than before transmitting the data over a bus such as the VESA bus. Generally, the digital CRTs use horizontal and vertical retrace intervals. For a digital CRT to display the same pixel format as a reduced blanking flat panel display monitor, the retrace time allocation may place a high peak bandwidth requirement on the graphic subsystem. Thus, the use of two TMDS links may be useful.

If a digital display is detected on initial system boot, only the primary TMDS link may be used. The secondary TMDS link may be activated after the graphic controller driver has determined that the capability for the second link exists in the display.

To provide display independence, in one embodiment of the invention, the platform 18 may separately encode a horizontal sync and the vertical sync into the TMDS channel. The platform 18 then encodes a data enable (DE) signal 178 in the TMDS channel. The DE signal may be an active high signal. The input data stream to the TMDS transmitter may include pixel and control data. The transmitter encodes either pixel or control data on any given input clock 180 cycle depending on the state of the DE signal 178. The active data enable signal indicates that pixel data is to be transmitted. The control data 164 is ignored when the pixel data is being transmitted and vice versa. At the TMDS receiver 174, the recovered pixel data may transition when DE is active and the control data may transition when DE is inactive.

Thus, the transmitter may include three encoders each driving one serial TMDS data channel. The input signal to each encoder is two control signals and eight bits of pixel data. Depending on the state of the DE signal, an encoder produces ten bit TMDS characters from either the two control signals or from the eight bits of pixel data. The output of each decoder is a continuous string of serialized TMDS characters.

The encode process for the active data period includes a first stage that produces a transition minimized nine bit code word from the input eight bits. The active data period is a time when the DE signal is active and pixel data encodings are present on the TMDS link. The second stage produces a ten bit code word, the finished TMDS character which manages the overall DC balance from the transmitted stream of characters. Thus, each link includes three data channels for each of red, green and blue pixel data. A channel is a single differential signaling pair. The first data link transmits odd pixel while the second data link transmits even pixels. The first pixel of each line is pixel number one, an odd pixel. The blanking period is a time on the link during which DE is inactive and control signals are present on the link. The control signals are signals transported over the link in addition to the data signals.

Figure 3:
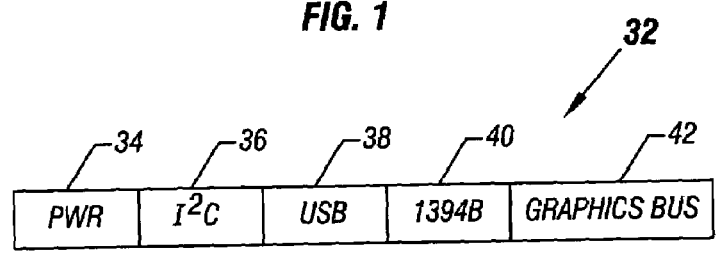
FIG. 3 is a depiction of a signal format which may be utilized by a platform in accordance with the embodiment shown in FIG. 1.

Each slot 22, 24, 26 or 28 in the platform 18 includes a connector 32 with a power plug 34 which supplies power to a card plugged into the slot. As shown in FIG. 3, in one embodiment of the invention, an inter-integrated circuit ($I^2C$) plug 36, a Universal Serial Bus (USB) plug 38 (USB Specification, Rev. 1.1, published Sep. 23, 1998 at www.usb.org), a 1394B plug 40 and a bus plug 42 are provided. The name 1394B refers to the Institute of Electrical and Electronics Engineers (IEEE) Specification 1394B-1995 which is a hot pluggable, high speed serial bus that operates at speeds at 800 to 3,200 megabits per second. The connectors may comply with the Device Bay Interface Specification, Revision 0.85 dated Feb. 6, 1998.

The devices plugged into the connector 32 generally draw power through the plug 34. The device bay connector includes a plug connector that resides on a removable device and receptacle connector that resides in the slot or bay 22, 24, 26 or 28. A device bay connector may include pin groups such as the 1394 pin group which interface to a 1394PHY, a USB pin group which interfaces to a USB hub, a power pin group which interfaces to a power supply as well as the graphics bus 42 and the $I^2C$ bus 36. A 1394PHY provides 1394 drivers and receivers. The slots 22, 24, 26 and 28 are slots, docks, bays or cavities that provide conductivity for cards or devices plugged therein. Peripherals may plug into any of the slots so that interoperability is achieved between different platforms.

The graphics bus 20 is a 32 bit multiprocessor style back plane bus in one embodiment of the present invention. At 100 megahertz, this bus transmits 400 megabytes per second or 3200 megabits per second peak speed. This allows devices plugged into the slots 22–28 to stream out raw video data through the bus 20. The power supply may use PC switched AC with magnetic coupling.

Figure 4:
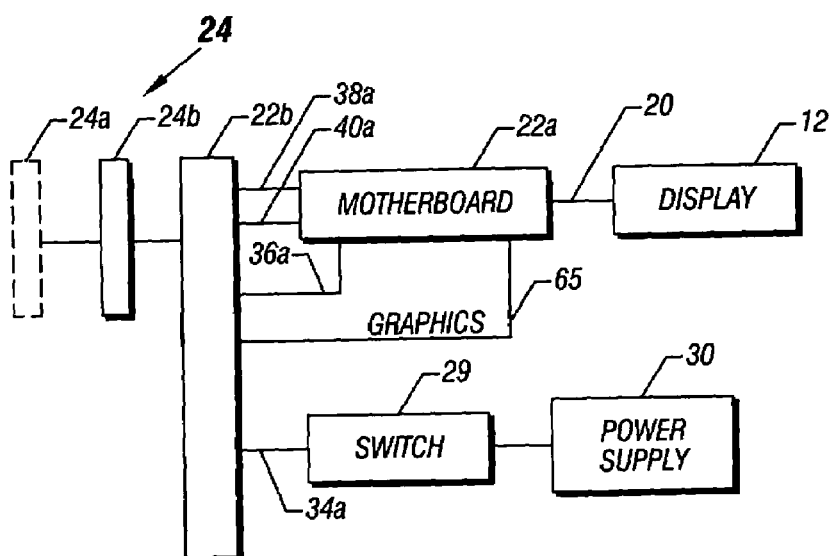
FIG. 4 is a schematic depiction of the interconnection scheme that may be used by each of the plug-and-play slots in the platform shown in FIG. 1.

Referring now to FIG. 4, an arrangement of the devices in the slots 22–28 is illustrated using the slot 24 as an example. The same types of techniques may be utilized with the other slots. A card 24a may be inserted into the slot 24 so as to contact the connector 24b in the slot 24. The connector 24b may be connected to the connector 22b in the slot 22. The connector 22b may be a Device Bay connector which couples via a USB bus 38a to the motherboard 22a contained in the slot 22. A 1394B bus 40a may also connect to the motherboard 22a as well as an $I^2C$ bus 36a in one embodiment. The graphics bus 65 couples the connector 22b to the motherboard 22a. The motherboard 22a may couple to the display housing 12 via the graphics bus 20.

The connector 22b may also couple the power supply 30 through a switch 29. The switch 29 may be a power field effect transistor. In this way, the instrumentation of the slot or bay may control device power.

Figure 5:
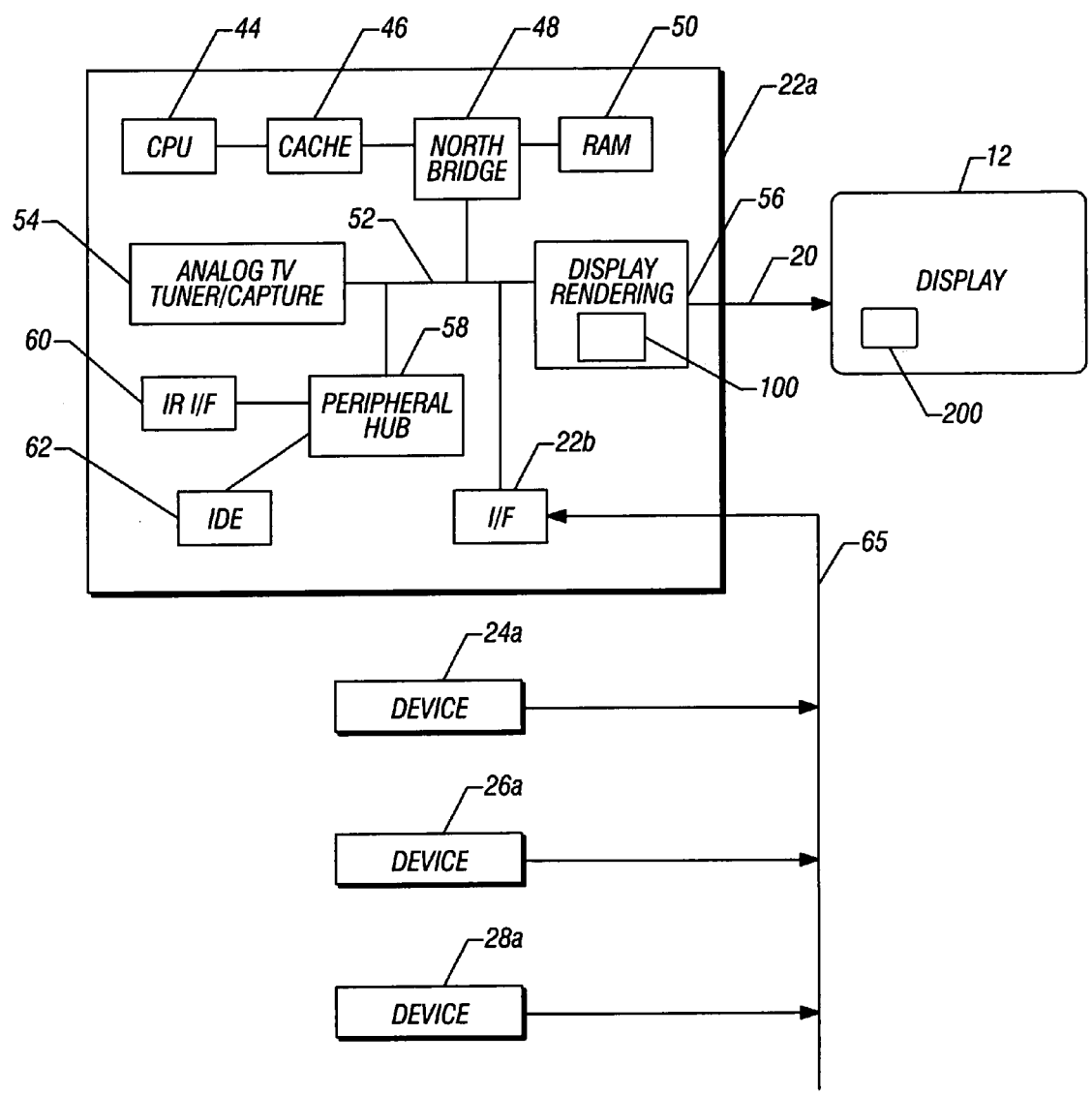
FIG. 5 is a block diagram of the platform shown in FIG. 1.

Referring now to FIG. 5, the motherboard 22a is shown as being coupled via the graphics bus 20 to the display housing 12 and to the devices 24a, 26a and 28a via the bus 65 which may include a combination of the signals indicated by the plugs 34, 36, 38 and 40. The motherboard 22a may include a processor 40 coupled to a cache memory 46 and a north bridge 38. The north bridge 48 may in turn be coupled to a bus 52 and a system memory in the form of a random access memory (RAM) 50.

The bus 52 may include an analog TV tuner/capture card such as the ISVR-III card available from Intel Corporation. The bus 52 may also couple a peripheral hub 58 which may, for example, be a USB hub which in turn is coupled to an infrared (IR) transceiver 60. The IR transceiver 60 facilitates communication with remote control units to enable to the user to remotely control the overall display system. Thus, the display itself may include no remote control and may be controlled entirely from the platform 18.

The hub 58 may also be coupled to an integrated device electronics (IDE) interface which may then couple to various storage devices, if desired. In addition, the interface 22b interfaces the motherboard 22a with devices 24a, 26a or 28a contained in the slots 22 through 28. The bus 65 illustrated in FIG. 5 may be a composite of a bus containing I²C, USB, 1394B and power.

A display rendering device 56 may also be coupled to the bus 52. The display rendering device 56 may provide the necessary conversions such as gamma function conversion, color space conversions and scaling for information transmitted to the display 12. In addition, the rendering device 56 may include an encryption/decryption engine 100 which transmits the information to an encryption/decryption engine in the display 12.

Figure 6:
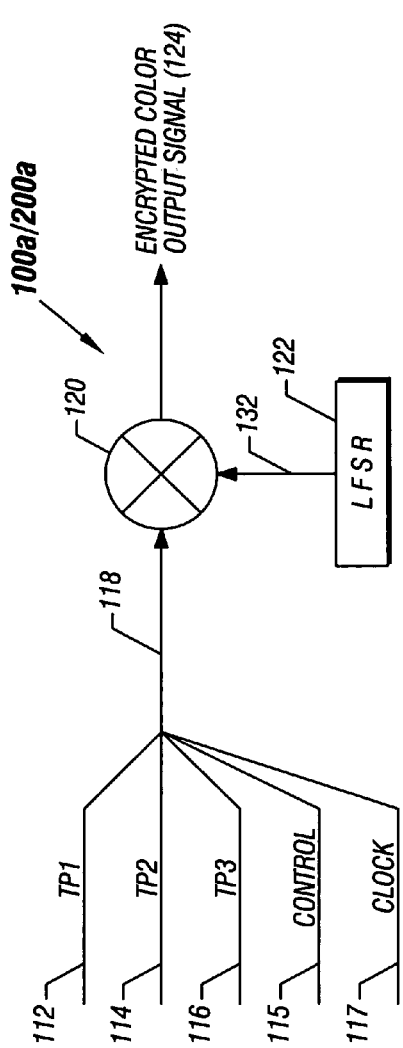
FIG. 6 is a block diagram of hardware for encrypting information between the platform and the display in one embodiment of the invention.

The encryption/decryption engine 100 on the motherboard 22a and the encryption/decryption engine 200 in the display 12 may include an encryption engine 100a/200a as shown in FIG. 6 in accordance with one embodiment of the present invention. The encryption engine may include a linear feedback shift register 122 whose output signal is combined, for example, in a logical combination such as an exclusive OR device with a stream 118 made up of color plane data. The color plane data may include a twisted pair (TP1) 112 which contains red color data, a twisted pair (TP2) 114 containing green color data and a twisted pair (TP3) 116 containing blue color data. The stream 118 may also include control information 115 and a clock signal 117. An encrypted color output signal 124 results from the logical combination of the linear feedback shift register output signal with the incoming color data.

Figure 7:
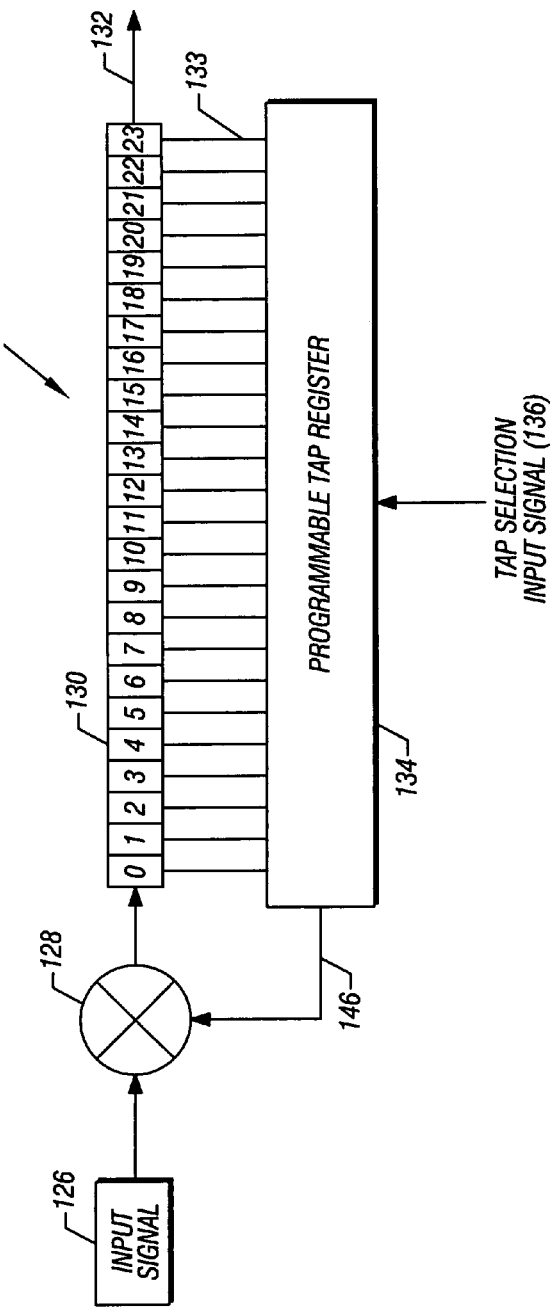
FIG. 7 is a schematic depiction of one embodiment of a linear feedback shift register useful in connection with the embodiment shown in FIG. 6.

Referring next to FIG. 7, the linear feedback shift register 122 is shown in more detail. A shift register 130 includes a plurality of cells numbered zero through twenty-three in one embodiment of the present invention. Based on the level of encryption which is desired, more or less cells may be utilized. The cells include a feedback path 146 which goes through a programmable tap register 134. The feedback information is combined in a logic element 128 with an input signal 126. The output of the linear feedback shift register 122 is indicated at 132. While a tap 133 is indicated as being connected to each of the cells zero through twenty-three, in some embodiments only a small number of the taps may actually be actuated by the programmable tap register 134. The feedback signal on the path 146 is the result of the signals from the cells which have active taps 133.

An input signal 126 causes the linear feedback shift register to generate a pseudorandom bit sequence as the output signal 132. The nature of the signal is dependent on which cells have active taps 133. The input signal 126, sometimes known as a seed, and a clock signal (not shown) may also be applied to the shift register 130. If a logical one bit is provided as the input signal 126, that bit causes the production of a pseudorandom signal in the output signal 132. Thus, the nature of the signal chosen as the seed together with the tap weights for the various cells effects the output signal 132. In general, the length of the output signal 132 is $2^{C-1}$ bits wherein C is the number of cells in the shift register.

While the hardware implementation of the linear feedback shift register is illustrated, those skilled in the art will appreciate that the same functions may also be implemented in software. Thus, a processor-based system may be programmed to produce the same effect as the linear feedback shift register described herein.

The programmable tap register 134 sets the tap weights and the location of the taps with respect to the cells 0–23. The tap register 134 receives a tap selection input signal 136 which, for example, may be produced by the processor 44 to control the encryption process.

In general, it may be advantageous, in some embodiments of the present invention, to use a relatively simple encryption engine on a frame by frame basis. At desired intervals, the encryption level may be changed by changing the tap selection signal 136. In one embodiment of the present invention, the same encryption values may be utilized for an entire frame of video and then on frame boundaries the encryption settings may be changed. Alternatively, the settings may be changed more than once in a frame or only after a given number of frames. The use of a weak encryption engine driven on frame boundaries by a better encryption engine, provides a good compromise between obtaining high throughput while adequately preventing piracy of the video information.

The logic element 128 may, in one embodiment of the present invention, be an adder implemented for example as an exclusive OR logic element. However, other logic elements may be utilized in other embodiments of the present invention.

Figure 8:
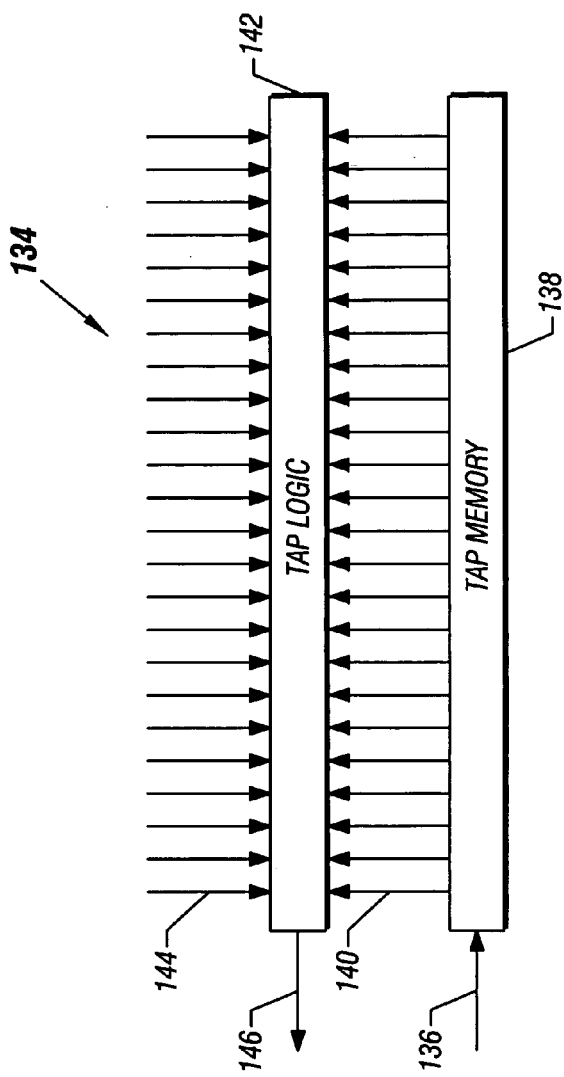
FIG. 8 is a schematic depiction of one embodiment of a programmable top register useful in the embodiment as shown in FIG. 7.

Turning next to FIG. 8, the programmable tap register 134, in one embodiment of the present invention, may include the tap logic 142 which receives signals 144 from the cells 130 and a tap memory 138 which receives the tap selection input signal 136. The tap memory 138 may provide the information which selects the weights and the cells which will be added to the feedback loop 146. Thus, the tap logic 142 may consist of logic elements such as adders which add the selected taps to the feedback stream under control from the tap memory 138.

Figure 9:
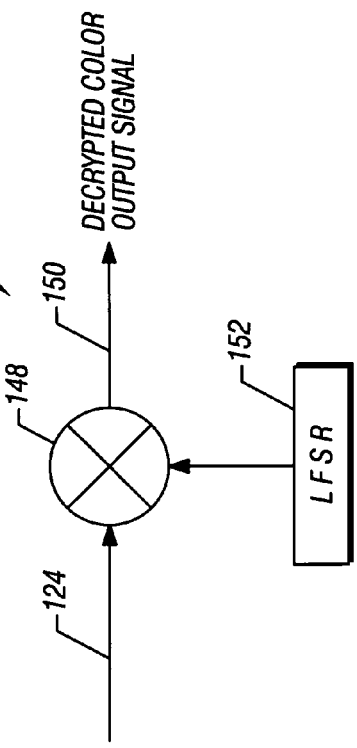
FIG. 9 is a schematic depiction of the decryption hardware in accordance with one embodiment of the present invention useful in conjunction with the encryption hardware shown in FIG. 6.

Each encryption/decryption engine 100 and 200 may also include a decryption engine 100b and 200b as illustrated in FIG. 9. The decryption engine works essentially in the reverse of the encryption engine, receiving an encrypted signal 124, and processing it through a logic element 148 in combination with the output from a linear feedback shift register 152 to produce a decrypted color output signal 150. The design of the linear feedback shift register 152 may be as described above in connection with FIGS. 6 and 7. The tap selection signal 136 utilized in the encryption process may also be provided to the decryption engine. This information may be provided together with control information which is transmitted over the bus 20 with the video data. Alternatively, the tap may be changed for encryption and decryption following a predetermined pattern.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A digital television system comprising:
 a first and second housing;
 a receiver to receive a digital television signal in said first housing, wherein said first housing is part of a modular platform including a plurality of replaceable cards;
 a digital television display in said second housing to receive processed video data in a digital format; and
 a digital graphics bus coupled to said receiver in said first housing and said display in said second housing to transmit the processed video data in the digital format from said first housing to said second housing, wherein the digital graphics bus comprises a first transition minimized differential signaling (TDMS) link and a second TDMS link.

2. The system of claim 1 wherein each of said cards is received in a plug, said plugs for said cards coupled by a bus.

3. The system of claim 1 wherein said digital graphics bus is coupled to an encryption engine to encrypt the processed video data before it is transmitted across said digital graphics bus.

4. The system of claim 1 wherein one of said cards is a motherboard including a processor.

5. The system of claim 4 wherein another of said cards is a television tuner/capture card.

6. The system of claim 1 including plugs in said platform for both power and data.

7. The system of claim 6 wherein said plugs are to receive two different types of serial bus interfaces.

8. The system of claim 1, wherein the first TDMS link is to transmit reduced blanking interval data.

9. The system of claim 4, wherein another of said cards includes a digital video storage.

10. The system of claim 1, wherein the system is to transmit the processed video data only on the first TDMS link based on a type of the digital television display.

11. The system of claim 10, wherein the system is to transmit the processed video data only on the first TDMS link, if the digital television display supports a high definition format having a reduced blanking interval.

12. The system of claim 1, wherein the first TDMS link is to transmit odd pixel data and the second TDMS link is to transmit even pixel data.

13. The system of claim 1, further comprising a transceiver in the first housing to communicate with a remote control device, wherein the first housing is to control the digital television display responsive to input from the remote control device.

14. A method of implementing a digital television system comprising:
 receiving a digital television signal with a receiver in a first housing, the first housing comprising a modular platform including a plurality of replaceable cards;
 transmitting digital encrypted video signals between said first housing and a second housing coupled to said first housing, said second housing including a display; and
 periodically changing the level of encryption of said digital encrypted video signals using a linear feedback shift register.

15. The method of claim 14 wherein changing the level of encryption includes changing the level of encryption on frame boundaries.

16. The method of claim 14 further comprising transmitting the digital encrypted video signals via a digital graphics bus.

17. The method of claim 14, further comprising combining an output of the linear feedback shift register with color plane data to obtain the digital encrypted video signals.

* * * * *